Jan. 6, 1959　　　　E. F. RIESING ET AL　　　2,867,457
FLUID SEAL
Filed July 16, 1954　　　　　　　　　　　　2 Sheets-Sheet 1
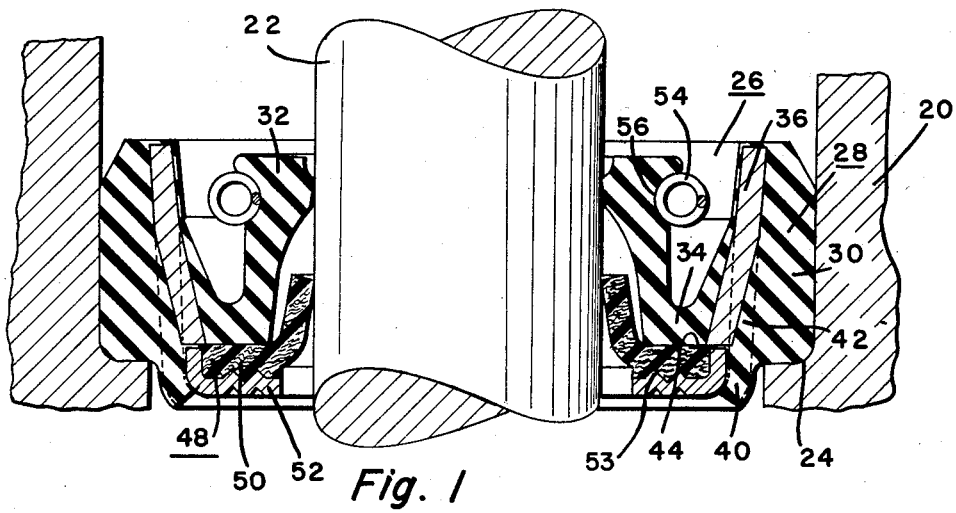
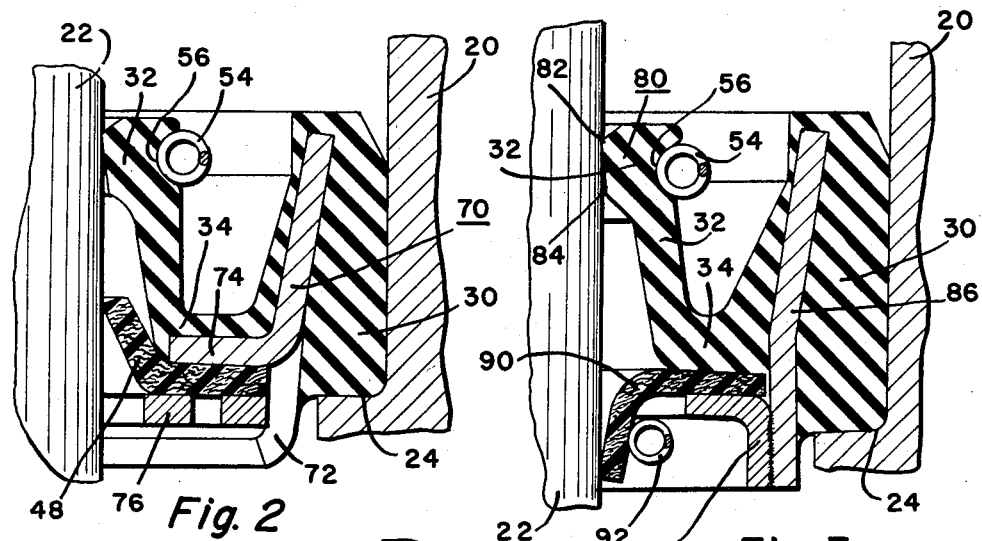
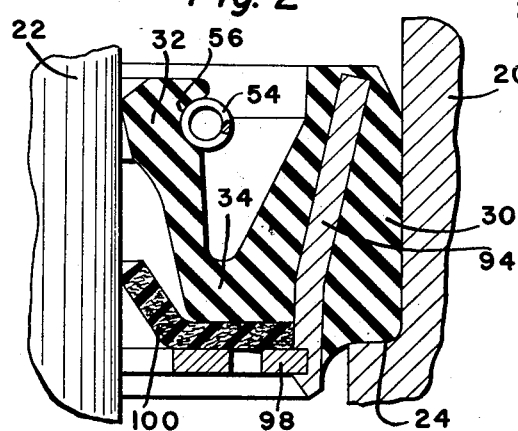
INVENTOR.
Ellwood F. Riesing
BY Cletus L. Moorman
Attorney Jan. 6, 1959     E. F. RIESING ET AL     2,867,457
FLUID SEAL
Filed July 16, 1954     2 Sheets-Sheet 2
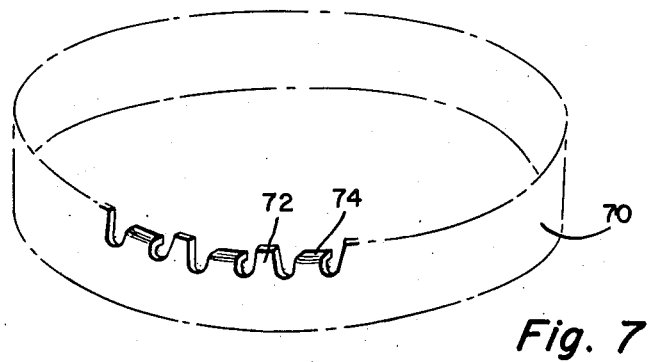
Fig. 7
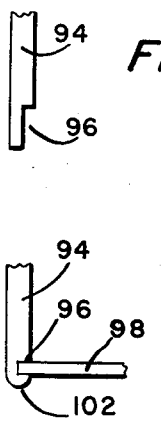
Fig. 5
Fig. 6
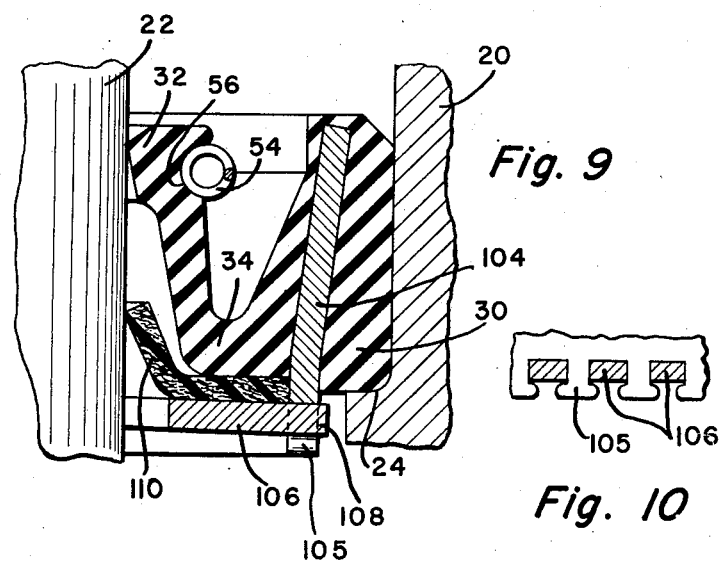
Fig. 9
Fig. 10
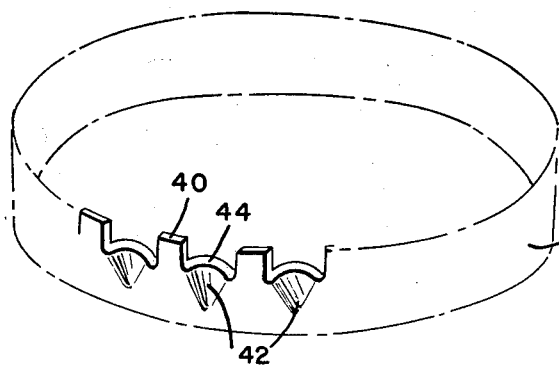
Fig. 8
INVENTOR.
Ellwood F. Riesing
BY Cletus L. Moorman
Attorney United States Patent Office 2,867,457
Patented Jan. 6, 1959

2,867,457

FLUID SEAL

Ellwood F. Riesing, Dayton, and Cletus L. Moorman, Trotwood, Ohio, assignors to General Motors Corporation, Detroit, Mich., a corporation of Delaware Application July 16, 1954, Serial No. 443,852

4 Claims. (Cl. 286—11.16)

This invention relates to fluid seals and is particularly concerned with fluid seals of the radial type adapted to seal a passage between two concentric, relatively movable cylindrical surfaces.

It is one of the objects of the invention to provide a fluid seal of the radial type for sealing a shaft within a housing wherein a unitary seal is provided which includes a secondary sealing lip made from a material different than the material used in the remainder of the fluid seal.

A further object of the invention is to provide a fluid seal of the radial type wherein primary and secondary sealing lips are used and wherein the primary lip is spring pressed against the shaft while the secondary lip is formed so as to normally resiliently ride against the shaft in sealing relation thereto.

In carrying out the above object, it is another object to provide the secondary sealing lip from a fibrous material with a rubbery component including a blooming agent, such as wax and a lubricating material, such as molybdenum disulphide, wherein said wax, upon the use of said seal, blooms and carries the molybdenum disulphide to the surface where its lubricating qualities will enhance the operation of the seal. The secondary sealing lip may be felt, suitably stiffened and with a rubbery impregnant, such as a butadiene-acrylonitrile latex, wherein the rubbery material includes among its compounding ingredients a blooming wax and molybdenum disulphide.

We have found that polychloroprene and butadiene-acrylonitrile copolymers, for example, may be used for this purpose as the basic ingredients wherein a suitable wax together with molybdenum disulphide are included in the compounding ingredients so that upon the blooming of the wax, the molybdenum disulphide is carried to the surface. In this connection, the materials above noted, wherein the rubbery component is in the latex phase, are incorporated in felt as a base structure to form a resilient material which has blooming characteristics due to the wax and which is well lubricated with respect to the shaft due to the molybdenum disulphide.

Further objects and advantages of the present invention will be apparent from the following description, reference being had to the accompanying drawing, wherein preferred embodiments of the present invention are clearly shown.

In the drawing:

Figure 1 is a view in cross section of the preferred embodiment of seal.

Figure 2 is a view in cross section of one-half of a modified form of seal.

Figure 3 is a view in cross section of one-half of a second modification of seal.

Figure 4 is a view in cross section of one-half of still a third modification of seal.

Figure 5 is a fragmentary sectional view of the reinforcing member used in connection with the seal shown in Figure 4.

Figure 6 is a view of the reinforcing member shown in Figure 5 after the assembly washer has been crimped in place.

Figure 7 is a fragmentary view in perspective showing the reinforcing member used in connection with the seal shown in Figure 2.

Figure 8 is a fragmentary view in perspective of the reinforcing member used in connection with the seal shown in Figure 1.

Figure 9 is a view in section of one-half of still another modification of seal design and Figure 10 is a fragmentary view partly in section of the reinforcing member and assembly washer used in connection with the seal shown in Figure 9.

Fluid seals of the radial type are generally used to seal the passageway between a shaft and a housing concentrically arranged thereabout wherein the shaft either reciprocates or rotates within the housing. Seals of this character are shown in copending applications, Serial Numbers 324,324, 330,426, 324,328, 324,325, 324,326 and 324,327, now Patent Numbers 2,797,944, 2,704,045, 2,736,585, 2,736,586, 2,768,849 and 2,736,584, respectively, all of which are assigned to the assignee here. These applications show various types of seals for general use. One of the most extensive uses for seals of this character is in connection with gear boxes, such as are used in transmissions, and rear axles of automotive vehicles wherein the grease or oil must be maintained within the housing and prevented from seeping along the shaft into contact with brakes, etc.

In seals of this nature, due to eccentricity of the shaft or axle, misalignment of the seal, etc., there is a tendency for the leakage of lubricant past the sealing lip. The present seal eliminates these difficulties through the use of a secondary sealing lip which will not function as a seal unless fluid passes the primary sealing lip.

In this connection, it is desirable that the secondary sealing lip is well lubricated with respect to the shaft since, as hereinbefore noted, there are many instances where the secondary sealing lip will not receive any lubricating effect from the fluid being sealed.

Referring to Figure 1, a housing 20, for example, an axle housing is shown concentrically arranged around a shaft or axle 22, which housing preferably includes a positioning shoulder 24 therein. A fluid seal assembly 26 is pressed within the housing and around the shaft until it is seated upon the shoulder 24. Seal 26 is made of elastomeric material including a body 28 which has a positioning flange 30 and a sealing flange 32 joined by a web 34 to form an open channel therebetween. Molded within the body 28 is a metallic reinforcing member 36 which is shown in more detail in Figure 8. This member 36 is castellated to form a plurality of turret portions 40 each provided with a depression 42 therebetween. The portions 42 are crimped inwardly as noted in Figure 8. These inwardly crimped portions form a plurality of interrupted shoulders noted at 44 while the castellated turrets 40 extend outwardly of the body portion 28. In assembly of the seal, a secondary sealing lip 48 is provided which is frusto-conical in shape and which includes an inwardly extending flange 50 thereon that may be positioned concentrically with the web portion 34 of the seal 26. A washer 52 including ribs or projections 53 is then put in place over the flange 50 of secondary sealing lip 48 and the ends of the castellated turrets 40 are crimped over as noted in Figure 1 to hold the washer 52 concentric and to cause it to clamp the flange of the frusto-conical secondary sealing lip 48 in tight relation to the remainder of the seal 26.

Thus when the seal 26 is installed in the housing 20 the primary sealing lip 32 bears against the shaft as does the secondary sealing lip 48. In order to enhance the sealing pressure of the sealing lip 32 against the shaft, a garter spring 54 is provided which fits within a groove 56 in the lip 32. The spring tends to inwardly deform the lip 32 into sealing engagement with the shaft.

The secondary sealing lip 48 is formed from a different material than the remainder of the seal which is preferably formed from an elastomeric material taken from the class consisting of butadiene-acrylonitrile copolymers, polychloroprenes, butyl rubbers, polyacrylates, etc. The material of the secondary lip is preferably felt or some other flexible fibrous material such as leather or shredded leather which has been impregnated with a rubber-like compound, for example, butadiene-acrylonitrile copolymer latex, (Buna N) a polychloroprene latex, etc., which includes a blooming wax thoroughly mixed with molybdenum disulphide as a lubricant. The quantities of wax may vary widely as may quantities of molybdenum disulphide. In this connection usual rubber techniques should be adhered to and the only limiting factor is that sufficient wax is present to cause a bloom on the impregnated felted sealing lip 48 upon warming up thereof during use, which bloom will cause the molybdenum disulphide to be carried to the surface and thus lubricate the secondary sealing lip with respect to the shaft. In this manner, the secondary sealing lip is always well lubricated even though no leakage of the lubricant being sealed occurs.

Examples of satisfactory impregnants for the felt are as follows:

| | Percent |
|---|---|
| Latex | 60 |
| Molybdenum disulphide | 20 |
| Wax | 20 |

This formulation may be varied between the following limits:

| | Percent |
|---|---|
| Latex | 90–50 |
| Molybdenum disulphide | 5–25 |
| Wax | 5–25 |

In this connection it is desirable to have the molybdenum disulphide in quantities equal to, or less than, the quantities of wax since the wax is used as the exuding or blooming agent.

Molybdenum disulphide is preferably mixed with the wax prior to incorporating the two materials into the latex and the wax is preferably used in emulsion form to facilitate subsequent mixing with the latex.

The wax may be either a micro-crystalline wax or may be a high melting point member of the methane series having thirty carbon atoms or more per molecule. Also, mixtures of such waxes may be used. It is preferable that the wax or mixtures thereof has a melting point in the order of 125°–190° F.

It is understood that in all cases, the latex noted in the recipes includes suitable compounding ingredients therein such as vulcanizing agents in the form of sulphur, suitable accelerators, etc. so that the final compound will cure upon vulcanization thereof, as is well known in the art.

In practice, the felt is impregnated with the combined latex, wax and molybdenum disulphide and is then air-dried after which the secondary sealing lip or washer may be formed in a mold from the sheet material and cured under standard conditions, for example, at 310° F. for about twenty minutes.

Figure 2 shows another embodiment of the seal wherein the only difference resides in the metal reinforcing ring 70. In this case a detailed view of the ring is shown clearly in Figure 7, wherein the ring is castellated to form a plurality of turrets 72 and wherein the material between the turrets 72 is bent inwardly at substantially right angles to form an interrupted ledge 74. In this connection, the secondary sealing lip 48 is put in place and an assembly washer 76 is placed thereover whereupon the outer extremities of the castellations 72 are swedged over to lock the washer concentrically in place.

Figure 3 shows still another embodiment of the seal wherein a sealing lip 80 is provided on the sealing flange 32 which includes two spaced sealing lip portions 82 and 84 thereon. The portion 82 is more or less an edge contact while the portion 84 provides a substantial surface contact. In this seal, the reinforcing member is shown at 86 and is substantially a frustro-conical sleeve while the assembly washer 88 is a flanged washer which is press fitted within the upper end of the reinforcing sleeve 86. Between the web portion 34 of the seal and the assembly washer 88 is a felted secondary sealing lip 90. When the assembly washer 88 is pressed into place, it may be spot welded in such position or may merely be a tight press fit to maintain position. In either case, the felted secondary sealing lip 90 is held tightly in the assembly. In the seal shown in Figure 3, the secondary sealing lip also includes a garter spring 92 to increase the sealing pressure thereof against the shaft.

Figure 4 shows still another embodiment of the invention wherein a reinforcing member 94 is used. This member is undercut as at 96 around the upper edge thereof. The assembly washer 98 is dropped into this undercut against the secondary sealing lip 100 and then the edge of the reinforcing member is swedged as at 102 shown in Figure 6.

Figure 9 shows another embodiment of the seal structure wherein a reinforcing sleeve 104 is utilized. In this instance, the sleeve is castellated as noted in Figure 10 at 105 to form shallow notches between the castellations and the assembly washer 106 is also castellated as at 108 so that the castellations 108 fit between the castellations 105 whereupon the tops of the castellations 105 are peened over for locking the washer 106 in place which in turn clamps the secondary sealing lip 110 between the washer 106 and the main body of the seal.

In all embodiments therefore it will be noted that a secondary sealing lip is provided, which secondary sealing lip has a sealing fit around the shaft and assures that there will be no passage of grease or oil along the shaft even though a slight seepage may occur past the primary lip.

One of the features of this invention is the fibrous secondary sealing lip which is self-lubricating in its action against the shaft so that the lip stays flexible and tight about the shaft even though no external lubrication is added. Actual tests have shown that the blooming of the wax in the rubbery compound will carry particles of the molybdenum disulphide lubricant to the surface of the felted lip where it is made readily available for lubricating purposes without, in any way, presenting an oily material which might be detrimental to instrumentalities outside of the sealed area. In this connection, it is known that felt has been used in many instances, for purposes of sealing a shaft, but in these cases, the excess of oil in the felt passes along the shaft and creates an undesirable condition at the outer side of the sealed area. In the present instance, not only is the secondary sealing lip self-lubricating but it is impervious to the seepage of oil therethrough since the pores of the felt have been completely filled with the rubbery compound during the impregnation thereof so that the secondary sealing lip holds back any seepage of oil or grease which may occur along the shaft.

While the embodiments of the present invention as herein disclosed, constitute preferred forms, it is to be understood that other forms might be adopted.

What is claimed is as follows:

1. A fluid seal of the radial type comprising in combination; an annular body of elastomeric material adapted to be positioned between relatively moving concentrically located members, said body including a sealing lip of annular shape adapted to radially seal against one of said members, a garter spring disposed around said lip for increasing the sealing force thereof, an annular reinforcing member molded within a portion of said body of elastomeric material and spaced from said sealing lip, said reinforcing member including a castellated portion extending outwardly of the body and spaced from the sealing lip, said castellated portion including a plurality of alternately outwardly extending and inwardly turned portions for forming a seat, an annular resilient sealing member spaced from the sealing lip and positioned by association with said seat and adapted to bear against said one of the members to be sealed at a point remote from the engagement of the sealing lip, said annular resilient member being held in clamped relation to the remainder of said seal by the swedging over of said upstanding portions of said reinforcing member.

2. The device as claimed in claim 1 wherein said annular resilient sealing member is a felted ring impregnated with a latex compound including a blooming wax and molybdenum disulphide.

3. A fluid seal of the radial type comprising in combination; an annular body of elastomeric material adapted to be positioned between relatively moving concentrically located members, said body including: a sealing lip of annular shape adapted to radially seal against one of said members, a garter spring disposed around said lip for increasing the sealing force thereof, an annular reinforcing member molded within a portion of said body and spaced from said sealing lip, said reinforcing member including a flange formed by a plurality of interrupted inwardly turned portions of the reinforcing member, an annular resilient member disposed upon said flange and adapted to bear against said one of the members to be sealed, and clamping means formed by other of the interrupted portions of the reinforcing member for clamping said annular resilient member in fluid tight relation to said flange.

4. A sealing member for use as a radial seal comprising a molded felted ring wherein the smallest diameter is dimensioned to resiliently grip and surround the shaft to be sealed, said felted ring being impregnated with a vulcanized latex compound which includes a blooming wax and molybdenum disulphide wherein the wax and molybdenum disulphide vary between 5 and 25% each with the latex making up the remainder of the latex compound.

References Cited in the file of this patent

UNITED STATES PATENTS

| | | |
|---|---|---|
| 285,648 | Morrison | Sept. 25, 1883 |
| 954,655 | Snyder | Apr. 12, 1910 |
| 2,172,325 | Victor et al. | Sept. 5, 1939 |
| 2,210,748 | Bernstein | Aug. 6, 1940 |
| 2,373,461 | Crampton | Apr. 10, 1945 |
| 2,644,804 | Rubin | July 7, 1953 |
| 2,695,801 | Kosatka | Nov. 30, 1954 |

FOREIGN PATENTS

| | | |
|---|---|---|
| 363,425 | Great Britain | Dec. 24, 1931 |
| 867,189 | Germany | Feb. 16, 1953 |